United States Patent
Ito et al.

(10) Patent No.: US 11,828,487 B2
(45) Date of Patent: Nov. 28, 2023

(54) AIR-CONDITIONING APPARATUS

(71) Applicant: Mitsubishi Electric Corporation, Tokyo (JP)

(72) Inventors: Shinichi Ito, Tokyo (JP); Masaki Toyoshima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 209 days.

(21) Appl. No.: 17/432,314

(22) PCT Filed: Apr. 24, 2019

(86) PCT No.: PCT/JP2019/017437
§ 371 (c)(1),
(2) Date: Aug. 19, 2021

(87) PCT Pub. No.: WO2020/217341
PCT Pub. Date: Oct. 29, 2020

(65) Prior Publication Data
US 2022/0341604 A1      Oct. 27, 2022

(51) Int. Cl.
*F24F 3/14* (2006.01)
*F24F 11/80* (2018.01)
*F24F 1/0003* (2019.01)

(52) U.S. Cl.
CPC .......... *F24F 3/1411* (2013.01); *F24F 1/0003* (2013.01); *F24F 11/80* (2018.01)

(58) Field of Classification Search
CPC ........ F24F 3/1411; F24F 11/80; F24F 1/0003; F24F 11/0008; F24F 11/30; F24F 2140/20
See application file for complete search history.

(56) References Cited

U.S. PATENT DOCUMENTS

| 6,619,064 | B1 | 9/2003 | Piao et al. |
| 2017/0205086 | A1* | 7/2017 | Yanase ................... F24F 13/20 |
| 2019/0011137 | A1 | 1/2019 | Horie et al. |

FOREIGN PATENT DOCUMENTS

| DE | 11 2015 006 816 T5 | 5/2018 |
| EP | 3 505 838 A1 | 7/2019 |

(Continued)

OTHER PUBLICATIONS

WO2017029741A1 Translation (Year: 2017).*

(Continued)

*Primary Examiner* — Schyler S Sanks
(74) *Attorney, Agent, or Firm* — POSZ LAW GROUP, PLC

(57) ABSTRACT

The indoor unit has an air passage formed therein to allow the indoor air drawn in the indoor unit to pass therethrough. The first indoor heat exchanger, the adsorption and desorption device, and the second indoor heat exchanger are arranged in the air passage. The second indoor heat exchanger is disposed downstream of the first indoor heat exchanger, and the adsorption and desorption device is disposed downstream of the first indoor heat exchanger and upstream of the second indoor heat exchanger. To perform dehumidifying control, the controller controls the opening degree of the first expansion valve and the second expansion valve to enable switching between cooling adsorption mode where the adsorption and desorption device adsorbs moisture in the indoor air and cooling desorption mode where the adsorption and desorption device desorbs the adsorbed moisture.

11 Claims, 7 Drawing Sheets

(56) References Cited

FOREIGN PATENT DOCUMENTS

| | | | |
|---|---|---|---|
| GB | 2525112 A | 10/2015 | |
| JP | 2000-257968 A | 9/2000 | |
| JP | 2007-240128 A | 9/2007 | |
| JP | 2014-208320 A | 11/2014 | |
| WO | 2014/118871 A1 | 8/2014 | |
| WO | WO-2017029741 A1 * | 2/2017 | ............. F24F 11/77 |
| WO | 2018/037545 A1 | 3/2018 | |
| WO | WO-2018037545 A1 * | 3/2018 | ............ F24F 1/0063 |

OTHER PUBLICATIONS

WO2018037545A1 Translation (Year: 2018).*
Extended European Search Report dated Mar. 14, 2022 issued in corresponding European Patent Application No. 19926632.1.
International Search Report of the International Searching Authority dated Jun. 4, 2019 in corresponding International Patent Application No. PCT/JP2019/017437 (and English translation).

* cited by examiner

AIR-CONDITIONING APPARATUS

CROSS REFERENCE TO RELATED APPLICATION

This application is a U.S. national stage application of PCT/JP2019/017437 filed on Apr. 24, 2019, the contents of which are incorporated herein by reference.

TECHNICAL FIELD

The present disclosure relates to an air-conditioning apparatus that dehumidifies an indoor space.

BACKGROUND ART

Air-conditioning apparatuses have been proposed that include a rotary desiccant rotor having an adsorbent capable of adsorbing and desorbing moisture and use a heater as a regenerative heat source for the adsorbent in the desiccant rotor (see, e.g., Patent Literature 1). In the air-conditioning apparatus described in Patent Literature 1, outdoor air is dehumidified by adsorbing moisture in a part of the desiccant rotor disposed in an adsorption unit, heated by the heater, compressed by a compressor, cooled by a heat exchanger, and supplied to an indoor space. Indoor air is heated by the heat exchanger, humidified by desorbing moisture in a part of the desiccant rotor disposed in a desorption unit, and blown out to an outdoor space. The air-conditioning apparatus described above rotates the desiccant rotor to move the desiccant rotor between the adsorption unit and the desorption unit, and repeats adsorption in the adsorption unit and desorption in the desorption unit to continuously dehumidify the air supplied to the indoor space.

CITATION LIST

Patent Literature

Patent Literature 1: Japanese Unexamined Patent Application Publication No. 2000-257968

SUMMARY OF INVENTION

Technical Problem

In the air-conditioning apparatus described in Patent Literature 1, outdoor air is dehumidified and supplied to the indoor space. In some seasons, outdoor air tends to be highly humid and it has been difficult to stabilize the dehumidifying capacity. Using a heater as a regenerative heat source for the adsorbent in the desiccant rotor has also been a problem in that it causes high power consumption.

The present disclosure has been made to solve the problems described above. An object of the present disclosure is to provide an air-conditioning apparatus that is capable of delivering stable dehumidifying capacity with lower power consumption.

Solution to Problem

An air-conditioning apparatus according to an embodiment of the present disclosure includes an outdoor unit including a compressor and an outdoor heat exchanger and configured to draw in outdoor air from an outdoor space and blow out the outdoor air to the outdoor space; and an indoor unit including a first expansion valve, a first indoor heat exchanger, and a second indoor heat exchanger and configured to draw in indoor air from an indoor space and blow out the indoor air to the indoor space. The air-conditioning apparatus includes a second expansion valve installed in the outdoor unit or the indoor unit; a refrigerant circuit in which the compressor, the outdoor heat exchanger, the second expansion valve, the first indoor heat exchanger, the first expansion valve, and the second indoor heat exchanger are sequentially connected by pipes; an adsorption and desorption device including an adsorption material configured to adsorb moisture in air; and a controller configured to control the opening degree of the first expansion valve and the second expansion valve. The indoor unit has an air passage formed therein to allow the indoor air drawn in the indoor unit to pass therethrough. The first indoor heat exchanger, the adsorption and desorption device, and the second indoor heat exchanger are arranged in the air passage. The second indoor heat exchanger is disposed downstream of the first indoor heat exchanger, and the adsorption and desorption device is disposed downstream of the first indoor heat exchanger and upstream of the second indoor heat exchanger. To perform dehumidifying control, the controller controls the opening degree of the first expansion valve and the second expansion valve to enable switching between cooling adsorption mode where the adsorption and desorption device adsorbs moisture in the indoor air and cooling desorption mode where the adsorption and desorption device desorbs the adsorbed moisture.

Advantageous Effects of Invention

The air-conditioning apparatus according to the embodiment of the present disclosure includes the indoor unit that draws in indoor air from an indoor space and blows out the indoor air to the indoor space. That is, indoor air, which is more stable in humidity than outdoor air, is supplied to the indoor space. To perform dehumidifying control, the controller controls the opening degree of the first expansion valve and the second expansion valve to enable switching between cooling adsorption mode where the adsorption and desorption device adsorbs moisture in indoor air and cooling desorption mode where the adsorption and desorption device desorbs the adsorbed moisture. In other words, no heater is used for adsorption and desorption in the adsorption material of the adsorption and desorption device. Stable dehumidifying capacity can thus be delivered with lower power consumption.

DESCRIPTION OF EMBODIMENTS

Figure 1:
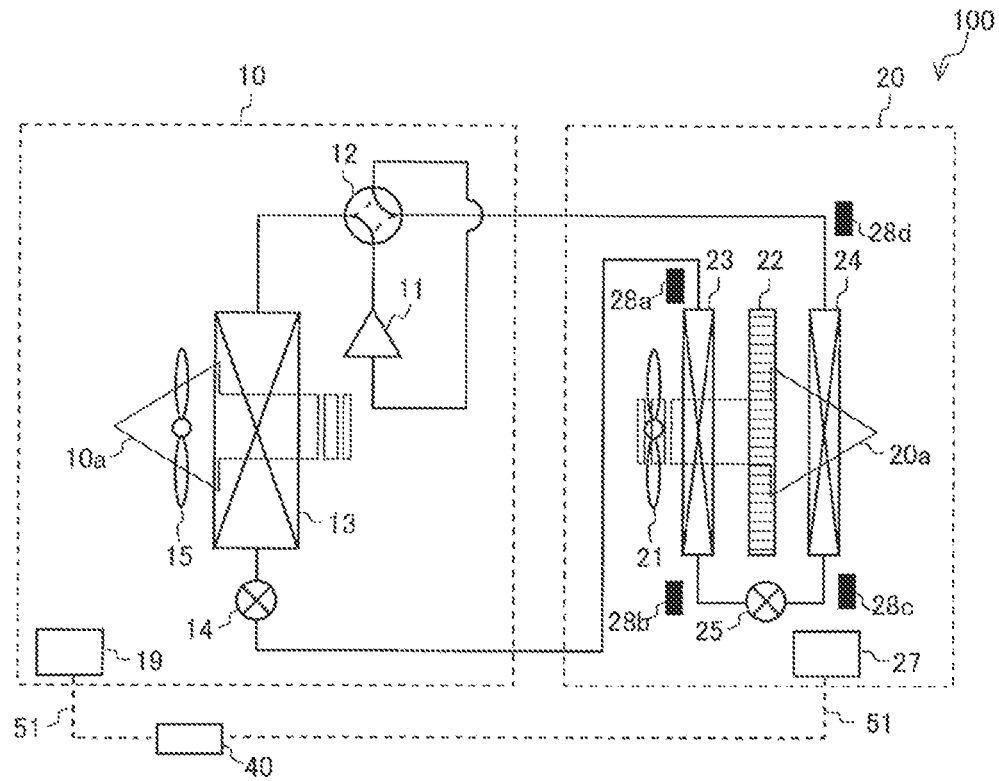
FIG. 1 is a refrigerant circuit diagram illustrating an exemplary configuration of an air-conditioning apparatus according to Embodiment 1.

Embodiments 1 and 2 will now be described on the basis of the drawings. It should be understood that the following description is not intended to limit Embodiments 1 and 2. Also, dimensional relations between components illustrated in the drawings may differ from actual ones.

Embodiment 1

An air-conditioning apparatus 100 according to Embodiment 1 will now be described. The air-conditioning apparatus 100 according to Embodiment 1 include an indoor unit 20 that dehumidifies an indoor space.

[Configuration of Air-Conditioning Apparatus 100]

FIG. 1 is a refrigerant circuit diagram illustrating an exemplary configuration of the air-conditioning apparatus 100 according to Embodiment 1. As illustrated in FIG. 1, the air-conditioning apparatus 100 includes an outdoor unit 10 that draws in outdoor air from an outdoor space and blows out the outdoor air to the outdoor space, and the indoor unit 20 that draws in indoor air from an indoor space and blows out the indoor air to the indoor space.

(Outdoor Unit 10)

As illustrated in FIG. 1, the outdoor unit 10 includes a compressor 11, a refrigerant flow switching device 12, an outdoor heat exchanger 13, a second expansion valve 14, and an outdoor fan 15. The outdoor unit 10 has an air passage 10a formed therein and configured to allow outdoor air drawn in from an outdoor space by the outdoor fan 15 to be sent through the outdoor heat exchanger 13 to the outdoor space.

The compressor 11 suctions low-temperature low-pressure refrigerant, compresses the suctioned refrigerant, and discharges the resulting high-temperature high-pressure refrigerant. The compressor 11 is constituted, for example, by an inverter compressor whose capacity, which is the amount of output per unit time, is controlled by varying the operation frequency. The operation frequency of the compressor 11 is controlled by a controller 40 through an outdoor unit control board 19. Although only one compressor 11 is used in this example, the configuration is not limited to this. For example, there may be provided two or more compressors 11 connected in parallel or series.

The refrigerant flow switching device 12 is, for example, a four-way valve, and switches the direction of flow of refrigerant to enable switching between cooling operation and heating operation. When cooling operation starts, the refrigerant flow switching device 12 switches to the state indicated by a solid line in FIG. 1 to connect the discharge side of the compressor 11 to the outdoor heat exchanger 13. When heating operation starts, the refrigerant flow switching device 12 switches to the state indicated by a broken line in FIG. 1 to connect the discharge side of the compressor 11 to a second indoor heat exchanger 24. The switching of the flow passage in the refrigerant flow switching device 12 is controlled by the controller 40 through the outdoor unit control board 19.

The outdoor heat exchanger 13 enables heat exchange between outdoor air and refrigerant. In cooling operation, the outdoor heat exchanger 13 functions as a condenser that transfers heat of the refrigerant to the outdoor air to condense the refrigerant. In heating operation, the outdoor heat exchanger 13 functions as an evaporator that evaporates the refrigerant to cool the outdoor air by heat of evaporation. The outdoor heat exchanger 13 is, for example, a cross-fin type fin-and-tube heat exchanger composed of a heat transmission tube and many fins.

The second expansion valve 14 is, for example, an electronic expansion valve capable of regulating the opening degree thereof. The second expansion valve 14 regulates the opening degree to control the pressure of refrigerant flowing into a first indoor heat exchanger 23. Although the second expansion valve 14 is installed in the outdoor unit 10 in Embodiment 1, it may be installed in the indoor unit 20, and the location of installation is not limited.

The outdoor fan 15 supplies outdoor air to the outdoor heat exchanger 13. The volume of air supplied to the outdoor heat exchanger 13 is regulated by controlling the rotation speed of the outdoor fan 15. The outdoor fan 15 is, for example, a centrifugal fan or a multiblade fan driven by a motor, such as a direct current (DC) fan motor or an alternating current (AC) fan motor. If the DC fan motor is used as a driving source for the outdoor fan 15, the volume of supply air is regulated by varying the current value to control the rotation speed. If the AC fan motor is used as a driving source for the outdoor fan 15, the volume of supply air is regulated by varying the power supply frequency, by means of inverter control, to control the rotation speed.

The outdoor unit 10 further includes the outdoor unit control board 19. The outdoor unit control board 19 is connected by a transmission line 51 to the controller 40. In accordance with an operation control signal from the controller 40, the outdoor unit control board 19 controls the compressor 11, the refrigerant flow switching device 12, the second expansion valve 14, and the outdoor fan 15.

(Indoor Unit 20)

The indoor unit 20 includes a first expansion valve 25, the first indoor heat exchanger 23, the second indoor heat exchanger 24, an adsorption and desorption device 22, and an indoor fan 21. The indoor unit 20 has an air passage 20a formed therein and configured to allow indoor air drawn in from an indoor space by the indoor fan 21 to be sent through the first indoor heat exchanger 23, the adsorption and desorption device 22, and the second indoor heat exchanger 24 to the indoor space.

The first expansion valve 25 is, for example, an electronic expansion valve capable of regulating the opening degree thereof. The first expansion valve 25 regulates the opening degree to control the pressure of refrigerant flowing into the first indoor heat exchanger 23.

The first indoor heat exchanger 23 is disposed in the air passage 20a. The second indoor heat exchanger 24 is disposed in the air passage 20a and located downstream of the first indoor heat exchanger 23. The first indoor heat exchanger 23 and the second indoor heat exchanger 24 are connected in series in the refrigerant circuit, and are both configured to enable heat exchange between air and refrigerant. Heating air or cooling air supplied to the indoor space is thus generated. The first indoor heat exchanger 23 functions as an evaporator or a condenser in cooling operation to cool or heat air flowing into the adsorption and desorption device 22. To perform cooling, the second indoor heat exchanger 24 functions as an evaporator or a condenser in cooling operation to cool air in the indoor space. To perform heating, the first indoor heat exchanger 23 and the second indoor heat exchanger 24 both function as a condenser in heating operation to heat air in the indoor space. Examples of the first indoor heat exchanger 23 and the second indoor heat exchanger 24 include a cross-fin type fin-and-tube heat exchanger composed of a heat transmission tube and many fins.

The adsorption and desorption device 22 is disposed downstream of the first indoor heat exchanger 23 and upstream of the second indoor heat exchanger 24 in the air passage 20a. That is, the adsorption and desorption device 22 is disposed in the same air passage 20a as the first indoor heat exchanger 23 and the second indoor heat exchanger 24, and is located between the first indoor heat exchanger 23 and the second indoor heat exchanger 24. The adsorption and desorption device 22 includes an adsorption material that adsorbs moisture in air. The adsorption and desorption device 22 adsorbs and desorbs moisture from and to the supplied air. Specifically, the adsorption and desorption device 22 adsorbs moisture from air of relatively high humidity and desorbs moisture to air of relatively low humidity.

The indoor fan 21 supplies indoor air to the first indoor heat exchanger 23 and the second indoor heat exchanger 24. The volume of air supplied to the first indoor heat exchanger 23 and the second indoor heat exchanger 24 is regulated by controlling the rotation speed of the indoor fan 21. The indoor fan 21 is, for example, a centrifugal fan or a multi-blade fan driven by a motor, such as a DC fan motor or an AC fan motor. If the DC fan motor is used as a driving source for the indoor fan 21, the volume of supply air is regulated by varying the current value to control the rotation speed. If the AC fan motor is used as a driving source for the indoor fan 21, the volume of supply air is regulated by varying the power supply frequency, by means of inverter control, to control the rotation speed.

The flow rate of air passing through the adsorption and desorption device 22 is also changed by controlling the air volume of the indoor fan 21. The adsorption rate and the desorption rate of the adsorption material used in the adsorption and desorption device 22, that is, the moisture transfer rates between air and the adsorption material during adsorption and desorption increase with increasing flow rate of air passing through the adsorption material. This means that the adsorption and desorption capacities of the adsorption material can be increased by increasing the air volume of the indoor fan 21. Although the indoor fan 21 is disposed most upstream of the air passage 20a in Embodiment 1, the configuration is not limited to this. The indoor fan 21 may be disposed downstream of the position illustrated in FIG. 1, as long as a target air volume can be reached in the air passage 20a. Also, more than one indoor fan 21 may be provided for one air passage 20a. For example, the indoor fan 21 may be provided both upstream and downstream of the air passage 20a. That is, the position and the number of indoor fans 21 are not limited to those described above.

The outdoor unit 10 and the indoor unit 20 are connected to each other by pipes. The air-conditioning apparatus 100 includes a refrigerant circuit in which the compressor 11, the refrigerant flow switching device 12, the outdoor heat exchanger 13, the second expansion valve 14, the first indoor heat exchanger 23, the first expansion valve 25, and the second indoor heat exchanger 24 are sequentially connected by pipes to allow refrigerant to circulate therein.

Refrigerant used in the refrigerant circuit is not limited to a specific type. For example, the refrigerant may be a natural refrigerant, such as carbon dioxide, hydrocarbon, or helium; a chlorine-free refrigerant, such as HFC-410A or HFC-407C; a fluorocarbon refrigerant, such as R22 or R134a, used in existing products.

(Temperature Sensors)

The indoor unit 20 includes a plurality of temperature sensors constituted, for example, by thermistors. A first inlet temperature sensor 28a is disposed on the inlet side of the first indoor heat exchanger 23 in the flow of refrigerant in cooling operation. The first inlet temperature sensor 28a detects the temperature of refrigerant flowing into the first indoor heat exchanger 23 (hereinafter referred to as inlet temperature). A first outlet temperature sensor 28b is disposed on the outlet side of the first indoor heat exchanger 23 in the flow of refrigerant in cooling operation. The first outlet temperature sensor 28b detects the temperature of refrigerant flowing out of the first indoor heat exchanger 23 (hereinafter referred to as outlet temperature). A second inlet temperature sensor 28c is disposed on the inlet side of the second indoor heat exchanger 24 in the flow of refrigerant in cooling operation. The second inlet temperature sensor 28c detects the temperature of refrigerant flowing into the second indoor heat exchanger 24 (hereinafter referred to as inlet temperature). A second outlet temperature sensor 28d is disposed on the outlet side of the second indoor heat exchanger 24 in the flow of refrigerant in cooling operation. The second outlet temperature sensor 28d detects the temperature of refrigerant flowing out of the second indoor heat exchanger 24 (hereinafter referred to as outlet temperature).

The indoor unit 20 further includes an indoor unit control board 27. The indoor unit control board 27 is connected by the transmission line 51 to the controller 40. In accordance with an operation control signal from the controller 40, the indoor unit control board 27 controls the first expansion valve 25 and the indoor fan 21.

(Controller 40)

The controller 40 transmits an operation control signal to the outdoor unit 10 and the indoor unit 20 to control the entire air-conditioning apparatus 100. In accordance with temperature information detected by the temperature sensors in the indoor unit 20, the controller 40 controls the second expansion valve 14 and the first expansion valve 25 in such a way that in each mode of cooling operation, the first indoor heat exchanger 23 and the second indoor heat exchanger 24 have heating and cooling temperatures that are most suitable for dehumidifying operation.

Figure 2:
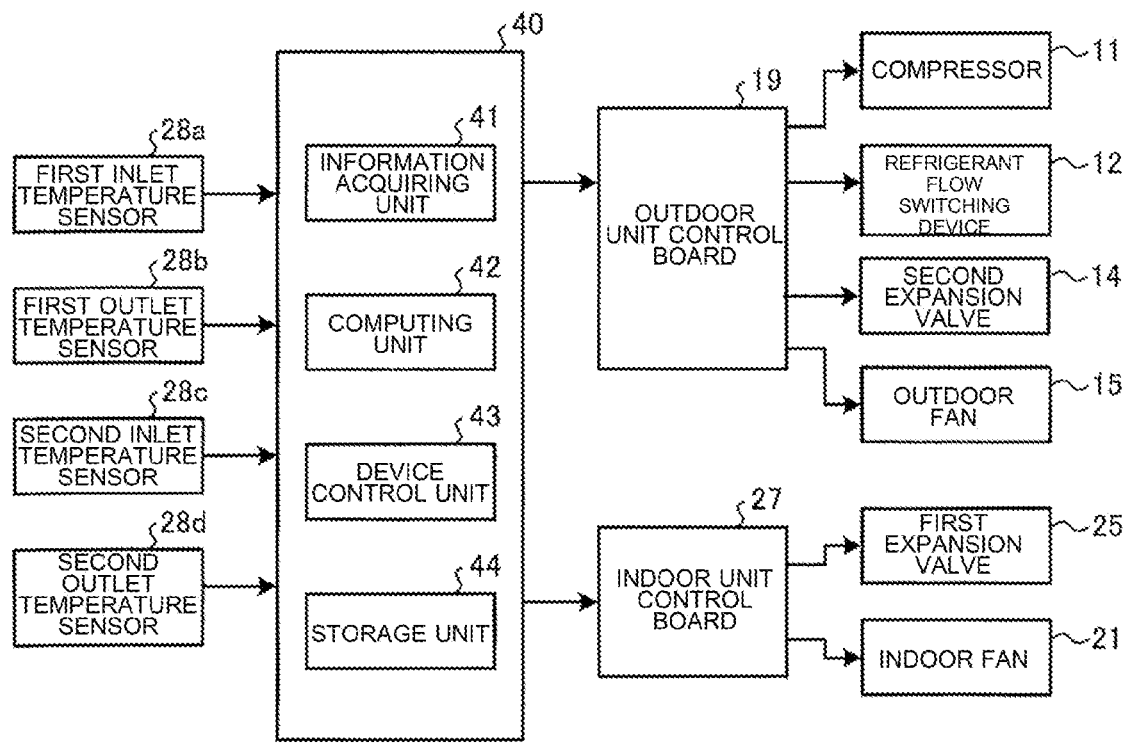
FIG. 2 is a block diagram illustrating an example of how a controller, an outdoor unit control board, and an indoor unit control board are connected to one another in the air-conditioning apparatus according to Embodiment 1.

FIG. 2 is a block diagram illustrating an example of how the controller 40, the outdoor unit control board 19, and the indoor unit control board 27 are connected to one another in the air-conditioning apparatus 100 according to Embodiment 1. As illustrated in FIG. 2, the first inlet temperature sensor 28a, the first outlet temperature sensor 28b, the second inlet temperature sensor 28c, and the second outlet temperature sensor 28d are individually connected to the controller 40. Also, the outdoor unit control board 19 and the indoor unit control board 27 are connected by the transmission line 51 to the controller 40.

The compressor 11, the refrigerant flow switching device 12, the second expansion valve 14, and the outdoor fan 15 are connected to the outdoor unit control board 19. The first expansion valve 25 and the indoor fan 21 are connected to the indoor unit control board 27.

The controller 40 includes an information acquiring unit 41, a computing unit 42, a device control unit 43, and a storage unit 44. The controller 40 executes software on a computing device, such as a microcomputer, to implement various functions. Alternatively, the controller 40 are constituted by hardware components, such as circuit devices, that implement various functions.

The information acquiring unit 41 acquires temperature information detected by the first inlet temperature sensor 28a, the first outlet temperature sensor 28b, the second inlet temperature sensor 28c, and the second outlet temperature sensor 28d.

The computing unit 42 performs various types of processing in accordance with the temperature information acquired by the information acquiring unit 41.

In accordance with the result of processing performed by the computing unit 42, the device control unit 43 generates an operation control signal for controlling each unit of the air-conditioning apparatus 100 and transmits the generated signal to the outdoor unit control board 19 and the indoor unit control board 27.

The storage unit 44 stores various values used in each unit of the controller 40. For example, the storage unit 44 is a nonvolatile or volatile semiconductor memory, such as a RAM, a ROM, a flash memory, an EPROM, or an EEPROM.

(Adsorption and Desorption Device 22)

Figure 3:
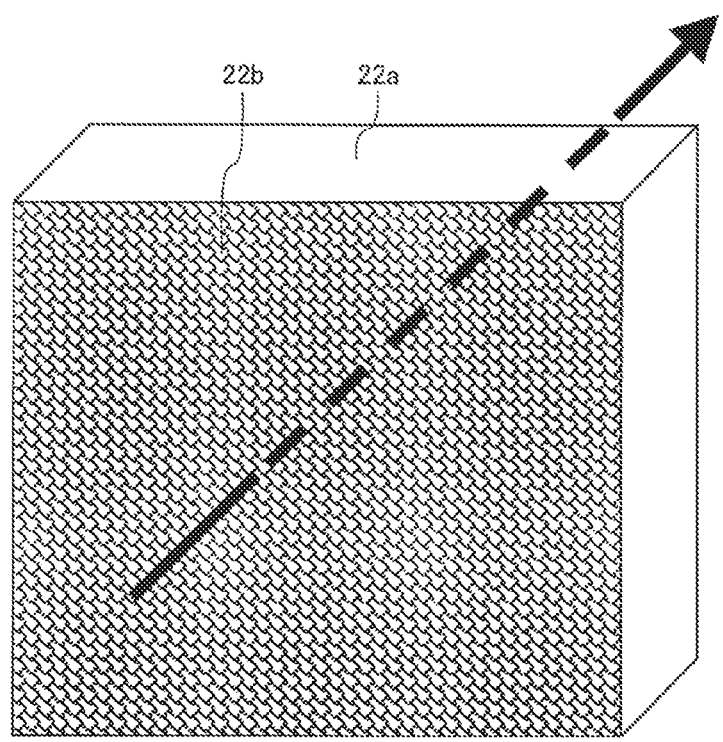
FIG. 3 is a schematic diagram illustrating a porous plate forming an adsorption and desorption device of the air-conditioning apparatus according to Embodiment 1.

FIG. 3 is a schematic diagram illustrating a porous plate forming the adsorption and desorption device 22 of the air-conditioning apparatus 100 according to Embodiment 1. A dashed arrow in FIG. 3 indicates the direction of airflow.

The adsorption and desorption device 22 according to Embodiment 1 will now be described. The adsorption and desorption device 22 is stationary with respect to the air passage 20a, and is secured in place in the air passage 20a. The adsorption and desorption device 22 is formed by using a porous plate 22a illustrated in FIG. 3. To provide a large cross-sectional area of airflow, the porous plate 22a has a polygonal shape along a pipe cross-section of the air passage 20a at the position where the adsorption and desorption device 22 is disposed. This can make the cross-sectional area of the adsorption and desorption device 22 equal to that of the first indoor heat exchanger 23 and the second indoor heat exchanger 24. The porous plate 22a is an air permeable member with a plurality of pores 22b formed therein that allow air to pass therethrough in the direction of thickness of the porous plate 22a. The porous plate 22a has an adsorption material formed on the surface thereof. The adsorption material has the property of adsorbing moisture from air of relatively high humidity and desorbing moisture to air of relatively low humidity.

That is, the adsorption and desorption device 22 according to Embodiment 1 includes the porous plate 22a and the adsorption material formed on the surface of the porous plate 22a. The adsorption material is formed into a layer by applying adsorbent to the surface of the porous plate 22a. The adsorption material may be supported on the surface of the porous plate 22a by impregnation, or may be formed on the surface of the porous plate 22a by surface treatment.

Figure 4:
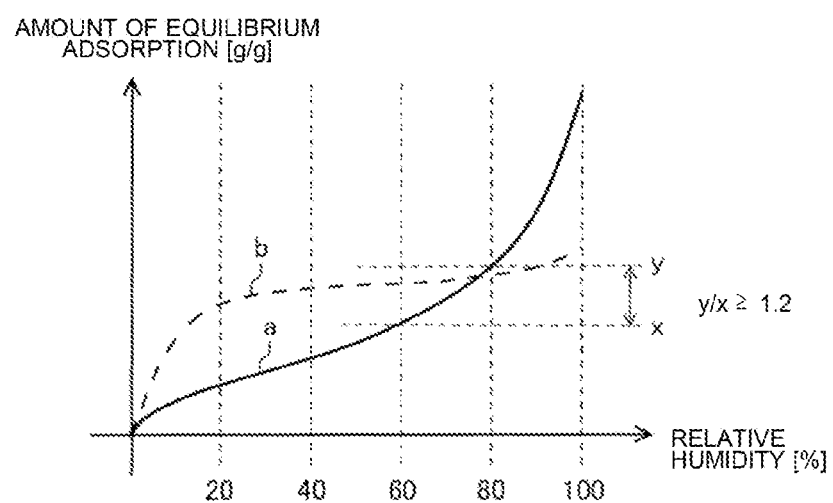
FIG. 4 is a graph showing how the amount of saturated adsorption on an adsorption material used in the adsorption and desorption device of the air-conditioning apparatus according to Embodiment 1 changes with relative humidity.

FIG. 4 is a graph showing how the amount of saturated adsorption on the adsorption material used in the adsorption and desorption device 22 of the air-conditioning apparatus 100 according to Embodiment 1 changes with relative humidity. In FIG. 4, the horizontal axis represents the relative humidity of air [%], and the vertical axis represents the amount of equilibrium adsorption per unit mass of the adsorption material [g/g].

A solid-line curve "a" in FIG. 4 represents an exemplary moisture adsorption property of the adsorption material particularly suitably used in Embodiment 1. Examples of the adsorption material particularly suitably used in Embodiment 1 include organic materials, such as sodium polyacrylate cross-linking agents, and inorganic materials, such silicate nanotube (imogolite) and aluminum silicate (HAS-Clay (registered trademark)).

A broken-line curve "b" represents an exemplary moisture adsorption property of an adsorption material that is used in commonly used desiccant rotors. Examples of the adsorption material used in commonly used desiccant rotors include silica gel and zeolite.

As indicated by the curve "a" in FIG. 4, the adsorption material particularly suitably used in Embodiment 1 has the property of monotonously increasing in the amount of equilibrium adsorption thereon with increasing relative humidity, and has the property of substantially linearly increasing in the amount of equilibrium adsorption thereon with increasing relative humidity particularly in the 40% to 100% relative humidity range. The adsorption material also has the property of being particularly large in the amount of equilibrium adsorption thereon in the 80% to 100% high relative humidity range.

With this adsorption material, it is possible to increase the difference between the amount of equilibrium adsorption on the adsorption material from air passing through the adsorption and desorption device 22 in cooling adsorption mode (described below) and the amount of equilibrium adsorption on the adsorption material from air passing through the adsorption and desorption device 22 in cooling desorption mode (described below). The adsorption capacity and the desorption capacity of the adsorption material can thus be improved.

In the adsorption material having the moisture adsorption property represented by the curve "b", although the amount of equilibrium adsorption monotonously increases with increasing relative humidity, the increase in the amount of equilibrium adsorption associated with an increase in relative humidity is slow. When this adsorption material is used in the adsorption and desorption device 22, it may be difficult to increase the amount of dehumidification of air in an indoor space with a relative humidity of about 40% to 60%, which is typical in the summer months.

To increase the amount of dehumidification, it is desirable to increase the difference between the amount of equilibrium adsorption on the adsorption material from air passing through the adsorption and desorption device 22 in cooling adsorption mode and the amount of equilibrium adsorption on the adsorption material from air passing through the adsorption and desorption device 22 in cooling desorption mode. To achieve this, it may be required in cooling desorption mode that air be heated, for example, by a heating device before passing through the adsorption and desorption device 22, to reduce the relative humidity of the air to about 20%.

In the adsorption material having the moisture adsorption property represented by the curve "a", the amount of equilibrium adsorption in the 80% to 100% high relative humidity range is particularly large. This means that without heating air to reduce the relative humidity, it is possible to sufficiently increase the difference between the amount of equilibrium adsorption from air in a typical indoor space with a relative humidity of about 40% to 60%, and the amount of equilibrium adsorption from air in an indoor space with a relative humidity of about 80% to 100%. Thus, by using the adsorption material having the moisture adsorption property represented by the curve "a" in the adsorption and desorption device 22, a continuous dehumidifying operation can be achieved without providing a desorption heat source in the air passage 20a.

The adsorption material has the property of decreasing in moisture transfer rate with decreasing temperature. The temperature of air flowing into the adsorption and desorption device 22 in cooling adsorption mode is lower than the temperature of air flowing into the adsorption and desorption device 22 in cooling desorption mode. Therefore, the amount of dehumidification is small in cooling adsorption mode, where the moisture transfer rate of the adsorption material is low. To increase the amount of dehumidification, it is necessary to use the adsorption material on which the amount of equilibrium adsorption in a high humidity range is sufficiently greater than the amount of equilibrium adsorption in a medium humidity range, by using the property that air flowing into the adsorption and desorption device 22 in cooling adsorption mode is in about the 80% to 100% high relative humidity range.

The high humidity range refers to the 80% to 100% relative humidity range, and the medium humidity range refers to the 40% to 60% relative humidity range, which is a typical humidity range in indoor space. Results of tests and verification found that by using a moisture adsorption material on which the amount of equilibrium adsorption in the high humidity range is greater than or equal to 1.2 times the amount of equilibrium adsorption in the medium humidity range, a loss of dehumidifying capacity caused by a decrease in the temperature of inflow air can be reduced.

Specifically, when the amount of equilibrium adsorption per unit mass for air with a relative humidity of 60%, x, and the amount of equilibrium adsorption per unit mass for air with a relative humidity of 80%, y, satisfy the relation "$y/x \geq 1.2$", a loss of dehumidifying capacity caused by a decrease in the temperature of inflow air can be reduced. The adsorption material having the moisture adsorption property represented by the curve "a" satisfies the relation "$y/x \geq 1.2$".

The air-conditioning apparatus 100 according to Embodiment 1 dehumidifies the indoor space by alternately executing cooling adsorption mode and cooling desorption mode in cooling operation. The air-conditioning apparatus 100 also executes high-capacity cooling adsorption mode in cooling operation, in addition to cooling adsorption mode and cooling desorption mode. Cooling adsorption mode, cooling desorption mode, and high-capacity cooling adsorption mode are switched from one to another by changing the opening degree of the second expansion valve 14 and the first expansion valve 25.

The operation of the air-conditioning apparatus 100 according to Embodiment 1 in cooling adsorption mode, cooling desorption mode, and high-capacity cooling adsorption mode of cooling operation will now be described. In Embodiment 1, the description of operation in heating operation will be omitted.

(Cooling Adsorption Mode)

Figure 5:
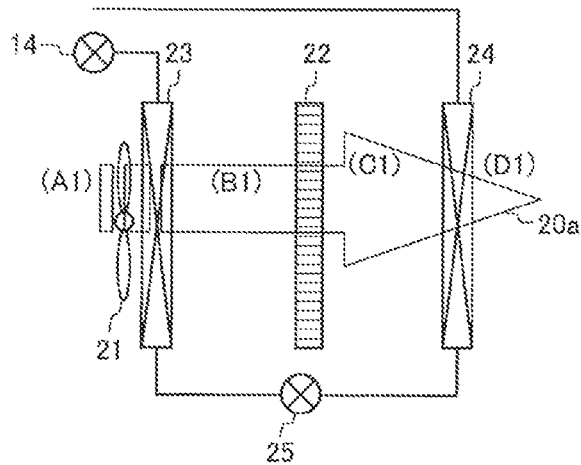
FIG. 5 is a schematic view for explaining an operation in cooling adsorption mode of the air-conditioning apparatus according to Embodiment 1.

FIG. 5 is a schematic view for explaining an operation in cooling adsorption mode of the air-conditioning apparatus 100 according to Embodiment 1. In cooling adsorption mode, high-temperature high-pressure gas refrigerant discharged from the compressor 11 passes through the refrigerant flow switching device 12 and flows into the outdoor heat exchanger 13. The high-temperature high-pressure gas refrigerant flowing into the outdoor heat exchanger 13 exchanges heat with outdoor air drawn in by the outdoor fan 15, condenses to high-pressure liquid refrigerant while rejecting heat, and flows out of the outdoor heat exchanger 13. The high-pressure liquid refrigerant flowing out of the outdoor heat exchanger 13 is reduced in pressure to low-temperature low-pressure two-phase gas-liquid refrigerant by the second expansion valve 14 set at a relatively low opening degree, and flows into the first indoor heat exchanger 23.

The low-temperature low-pressure two-phase gas-liquid refrigerant flowing into the first indoor heat exchanger 23 exchanges heat with indoor air drawn in by the indoor fan 21, evaporates to low-pressure gas refrigerant while removing heat to cool the indoor air, and flows out of the first indoor heat exchanger 23. The low-pressure gas refrigerant flowing out of the first indoor heat exchanger 23 is reduced in pressure by the first expansion valve 25 set at a relatively high opening degree, and flows into the second indoor heat exchanger 24. The low-pressure gas refrigerant flowing into the second indoor heat exchanger 24 exchanges heat with indoor air passing through the first indoor heat exchanger 23 and the adsorption and desorption device 22, evaporates while removing heat, and exchanges sensible heat with the indoor air to further cool the indoor air. The low-pressure gas refrigerant flowing out of the second indoor heat exchanger 24 flows out of the indoor unit 20. The low-pressure gas refrigerant flowing out of the indoor unit 20 is suctioned into the compressor 11.

Figure 6:
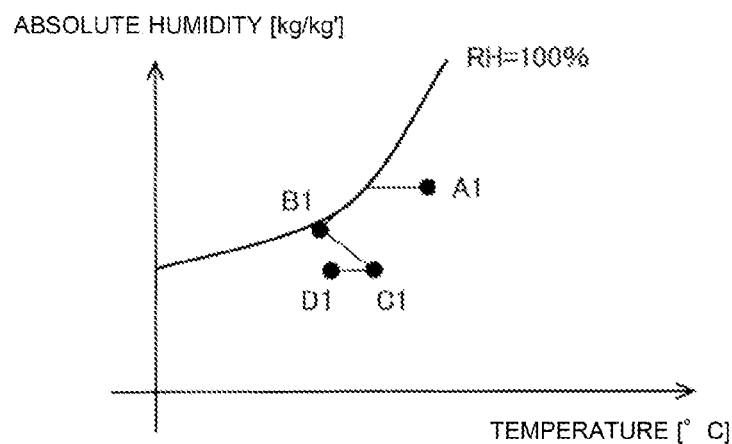
FIG. 6 is a psychrometric chart showing a state change of air in cooling adsorption mode of the air-conditioning apparatus according to Embodiment 1.

FIG. 6 is a psychrometric chart showing a state change of air in cooling adsorption mode of the air-conditioning apparatus 100 according to Embodiment 1. In FIG. 6, the horizontal axis represents temperature [° C.] and the vertical axis represents absolute humidity [kg/kg']. Point A1, point B1, point C1, and point D1 in FIG. 6 correspond to the positions of (A1), (B1), (C1), and (D1), respectively, in FIG. 5. In cooling adsorption mode, the second expansion valve 14 is set at a relatively low opening degree, and the first expansion valve 25 is set at a relatively high opening degree. Note that FIG. 6 is a diagram showing how the state of air changes when the adsorption and desorption device 22 retains only a small amount of moisture, for example, when ambient air is saturated.

Before flowing into the first indoor heat exchanger 23, indoor air is in the state represented by point A1. After passing through the first indoor heat exchanger 23 to exchange heat with refrigerant, the air is cooled and dehumidified to a low-temperature high-relative-humidity state (point B1) and flows into the adsorption and desorption device 22. Since the air with high relative humidity passes through the adsorption and desorption device 22, an adsorption reaction occurs in the adsorption material of the adsorption and desorption device 22, in which moisture in the air is adsorbed and the adsorption heat is rejected. Thus, by passing through the adsorption and desorption device 22, where the adsorption reaction takes place, the air is dehumidified, heated, and reduced in absolute humidity (point C1). The air then flows into the second indoor heat exchanger 24. After passing through the second indoor heat exchanger 24 to exchange sensible heat with refrigerant, the air is cooled (point D1) and supplied to the indoor space.

That is, in cooling adsorption mode, indoor air suctioned into the indoor unit 20 is dehumidified by cooling in the first indoor heat exchanger 23 and the adsorption reaction in the adsorption and desorption device 22, and is further cooled in the second indoor heat exchanger 24. The resulting low-temperature air with low absolute humidity is thus supplied to the indoor space.

(Cooling Desorption Mode)

Figure 7:
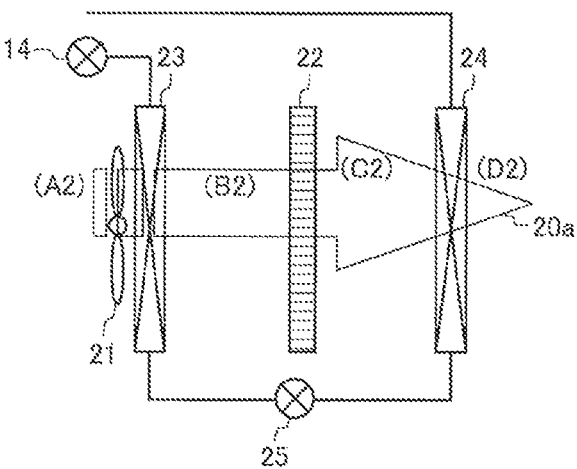
FIG. 7 is a schematic view for explaining an operation in cooling desorption mode of the air-conditioning apparatus according to Embodiment 1.

FIG. 7 is a schematic view for explaining an operation in cooling desorption mode of the air-conditioning apparatus 100 according to Embodiment 1. In cooling desorption mode, high-temperature high-pressure gas refrigerant discharged from the compressor 11 passes through the refrigerant flow switching device 12 and flows into the outdoor heat exchanger 13. The high-temperature high-pressure gas refrigerant flowing into the outdoor heat exchanger 13 exchanges heat with outdoor air drawn in by the outdoor fan 15, condenses to high-pressure liquid refrigerant while rejecting heat, and flows out of the outdoor heat exchanger 13. The high-pressure liquid refrigerant flowing out of the outdoor heat exchanger 13 is reduced in pressure by the second expansion valve 14 set at a relatively high opening degree, and flows into the first indoor heat exchanger 23.

The liquid refrigerant flowing into the first indoor heat exchanger 23 exchanges heat with indoor air drawn in by the indoor fan 21, condenses to heat the indoor air while rejecting heat, and flows out of the first indoor heat exchanger 23. The liquid refrigerant flowing out of the first indoor heat exchanger 23 is reduced in pressure to low-temperature low-pressure two-phase gas-liquid refrigerant by the first expansion valve 25 set at a relatively low opening degree, and flows into the second indoor heat exchanger 24. The low-temperature low-pressure two-phase gas-liquid refrigerant flowing into the second indoor heat exchanger 24 exchanges heat with indoor air passing through the first indoor heat exchanger 23 and the adsorption and desorption device 22, evaporates to low-pressure gas refrigerant while removing heat to cool the indoor air, and flows out of the second indoor heat exchanger 24. The low-pressure gas refrigerant flowing out of the second indoor heat exchanger 24 flows out of the indoor unit 20. The low-pressure gas refrigerant flowing out of the indoor unit 20 is suctioned into the compressor 11.

Figure 8:
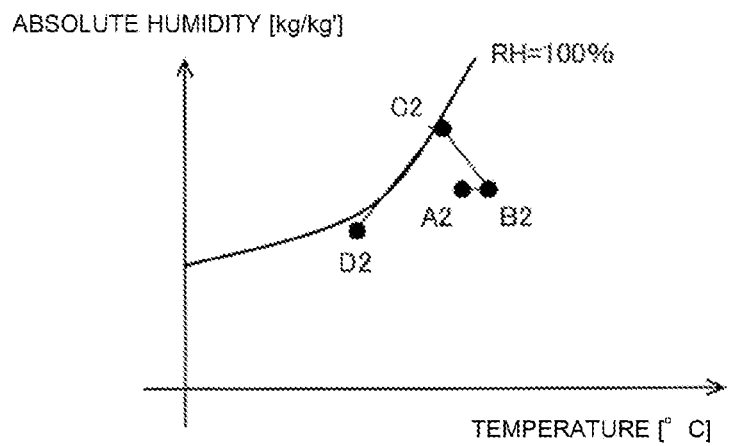
FIG. 8 is a psychrometric chart showing a state change of air in cooling desorption mode of the air-conditioning apparatus according to Embodiment 1.

FIG. 8 is a psychrometric chart showing a state change of air in cooling desorption mode of the air-conditioning apparatus 100 according to Embodiment 1. In FIG. 8, the horizontal axis represents temperature [° C.] and the vertical axis represents absolute humidity [kg/kg]. Point A2, point B2, point C2, and point D2 in FIG. 8 correspond to the positions of (A2), (B2), (C2), and (D2), respectively, in FIG. 7. In cooling desorption mode, the second expansion valve 14 is set at a relatively high opening degree, and the first expansion valve 25 is set at a relatively low opening degree. Note that FIG. 8 is a diagram showing how the state of air changes when the adsorption and desorption device 22 retains a large amount of moisture, for example, when saturation is reached in cooling adsorption mode.

Before flowing into the first indoor heat exchanger 23, indoor air is in the state represented by point A2. After passing through the first indoor heat exchanger 23 to exchange heat with refrigerant, the air is heated and reduced in relative humidity (point B2) and flows into the adsorption and desorption device 22. Since the air with low relative humidity passes through the adsorption and desorption device 22 and the adsorption material of the adsorption and desorption device 22 retains a large amount of moisture, a desorption reaction occurs in the adsorption material, in which moisture is released into the air and the desorption heat is removed. This reduces the amount of moisture retained by the adsorption material and regenerates the adsorption material. By passing through the adsorption and desorption device 22, where the desorption reaction takes place, the air is humidified and cooled (point C2). The resulting low-temperature air with high humidity then flows into the second indoor heat exchanger 24. By passing through the second indoor heat exchanger 24 to exchange heat with refrigerant, the air is cooled and dehumidified (point D2). The resulting low-temperature supply air with reduced absolute humidity is thus supplied to the indoor space.

That is, in cooling desorption mode, indoor air suctioned into the indoor unit 20 is humidified by desorption reaction in the adsorption and desorption device 22, but dehumidified by being cooled in the second indoor heat exchanger 24. The resulting low-temperature air with low absolute humidity is thus supplied to the indoor space.

(High-Capacity Cooling Adsorption Mode)

Figure 9:
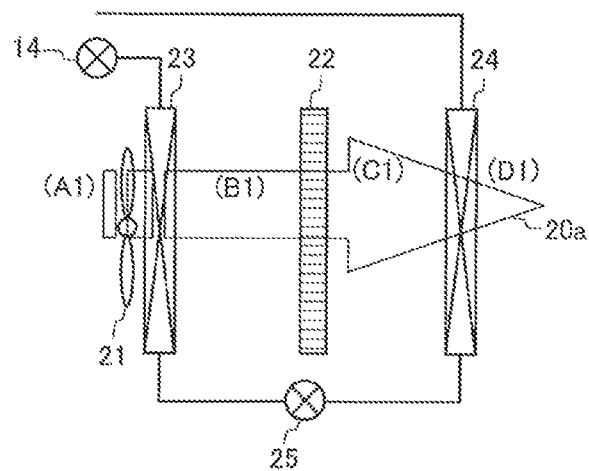
FIG. 9 is a schematic view for explaining an operation in high-capacity cooling adsorption mode of the air-conditioning apparatus according to Embodiment 1.

FIG. 9 is a schematic view for explaining an operation in high-capacity cooling adsorption mode of the air-conditioning apparatus 100 according to Embodiment 1. In high-capacity cooling adsorption mode, high-temperature high-pressure gas refrigerant discharged from the compressor 11 passes through the refrigerant flow switching device 12 and flows into the outdoor heat exchanger 13. The high-temperature high-pressure gas refrigerant flowing into the outdoor heat exchanger 13 exchanges heat with outdoor air drawn in by the outdoor fan 15, condenses to high-pressure liquid refrigerant while rejecting heat, and flows out of the outdoor heat exchanger 13. The high-pressure liquid refrigerant flowing out of the outdoor heat exchanger 13 is reduced in pressure to low-temperature low-pressure two-phase gas-liquid refrigerant by the second expansion valve 14 set at a relatively low opening degree, and flows into the first indoor heat exchanger 23.

The low-temperature low-pressure two-phase gas-liquid refrigerant flowing into the first indoor heat exchanger 23 exchanges heat with indoor air drawn in by the indoor fan 21, evaporates while removing heat to cool the indoor air, and flows out of the first indoor heat exchanger 23. The low-temperature low-pressure two-phase gas-liquid refrigerant flowing out of the first indoor heat exchanger 23 is reduced in pressure by the first expansion valve 25 set at a relatively high opening degree, and flows into the second indoor heat exchanger 24. The low-temperature low-pressure two-phase gas-liquid refrigerant flowing into the second indoor heat exchanger 24 exchanges heat with indoor air passing through the first indoor heat exchanger 23 and the adsorption and desorption device 22, evaporates while removing heat, exchanges sensible heat with the indoor air to further cool the indoor air, and flows out of the second indoor heat exchanger 24 as low-pressure gas refrigerant. The low-pressure gas refrigerant flowing out of the second indoor heat exchanger 24 flows out of the indoor unit 20. The low-pressure gas refrigerant flowing out of the indoor unit 20 is suctioned into the compressor 11.

Figure 10:
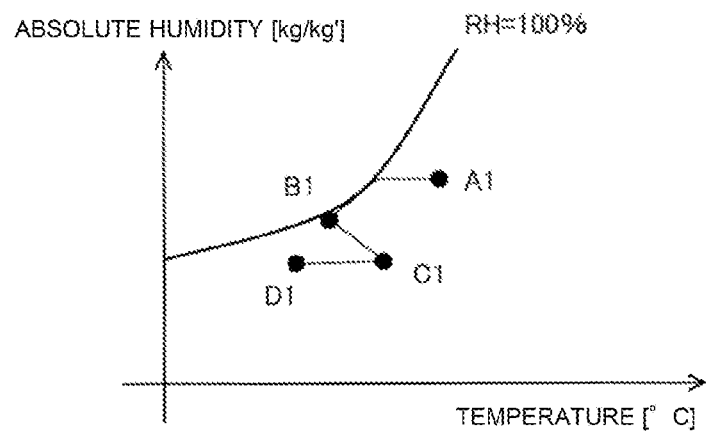
FIG. 10 is a psychrometric chart showing a state change of air in high-capacity cooling adsorption mode of the air-conditioning apparatus according to Embodiment 1.

FIG. 10 is a psychrometric chart showing a state change of air in high-capacity cooling adsorption mode of the air-conditioning apparatus 100 according to Embodiment 1. In FIG. 10, the horizontal axis represents temperature [° C.] and the vertical axis represents absolute humidity [kg/kg']. Point A1, point B1, point C1, and point D1 in FIG. 10 correspond to the positions of (A1), (B1), (C1), and (D1), respectively, in FIG. 9. In high-capacity cooling adsorption mode, the second expansion valve 14 is set at a relatively low opening degree, and the first expansion valve 25 is set at a relatively high opening degree. Note that FIG. 10 is a diagram showing how the state of air changes when the adsorption and desorption device 22 retains only a small amount of moisture, for example, when ambient air is saturated.

Before flowing into the first indoor heat exchanger 23, indoor air is in the state represented by point A1. After passing through the first indoor heat exchanger 23 to exchange heat with refrigerant, the air is cooled and dehumidified to a low-temperature high-relative-humidity state (point B1) and flows into the adsorption and desorption device 22. Since the air with high relative humidity passes through the adsorption and desorption device 22, an adsorption reaction occurs in the adsorption material of the adsorption and desorption device 22, in which moisture in the air is adsorbed and the adsorption heat is rejected. Thus, by passing through the adsorption and desorption device 22, where the adsorption reaction takes place, the air is dehumidified, heated, and reduced in absolute humidity (point C1). The air then flows into the second indoor heat exchanger 24. After passing through the second indoor heat exchanger 24 to exchange latent heat with refrigerant, the air is cooled (point D1) and supplied to the indoor space.

That is, in high-capacity cooling adsorption mode, indoor air suctioned into the indoor unit 20 is dehumidified by cooling in the first indoor heat exchanger 23 and the adsorption reaction in the adsorption and desorption device 22, and is further cooled in the second indoor heat exchanger 24. The resulting low-temperature air with low absolute humidity is thus supplied to the indoor space. Also, in high-capacity cooling adsorption mode, the position where the temperature is measured for calculating the degree of superheat (SH) in the second indoor heat exchanger 24 differs from that in cooling adsorption mode. Also, in high-capacity cooling adsorption mode, the opening degree of the second expansion valve 14 and the operation frequency of the compressor 11 differ from those in cooling adsorption mode. In cooling adsorption mode, sensible heat is exchanged between refrigerant and indoor air in the second indoor heat exchanger 24. In high-capacity cooling adsorption mode, however, latent heat is exchanged between refrigerant and indoor air in the second indoor heat exchanger 24, and this enables more effective cooling of air in the second indoor heat exchanger 24. This means that high-capacity cooling adsorption mode provides higher cooling capacity than cooling adsorption mode.

A description will now be given of how the second expansion valve 14 and the first expansion valve 25 are controlled in cooling adsorption mode, cooling desorption mode, and high-capacity cooling adsorption mode of cooling operation of the air-conditioning apparatus 100 according to Embodiment 1.

(Cooling Adsorption Mode)

In cooling adsorption mode, the first indoor heat exchanger 23 functions as an evaporator, and the second indoor heat exchanger 24 also functions as an evaporator. The cooling capacity of the second indoor heat exchanger 24 is reduced to reduce the sensible heat factor (SHF) of air conditioning capacity. Then, for the purpose of reducing air conditioning capacity, the controller 40 controls the second expansion valve 14 in such a way that the degree of superheat (SH) calculated from the difference between the inlet temperature of the first indoor heat exchanger 23 detected by the first inlet temperature sensor 28a and the outlet temperature of the first indoor heat exchanger 23 detected by the first outlet temperature sensor 28b is a predetermined value. This enables exchange of sensible heat between refrigerant and indoor air in the second indoor heat exchanger 24, and reduces the cooling capacity of the second indoor heat exchanger 24. For evaporating temperature, the controller 40 controls the operation frequency of the compressor 11, so that a predetermined capacity is ensured.

(Cooling Desorption Mode)

In cooling desorption mode, the first indoor heat exchanger 23 functions as a condenser, and the second indoor heat exchanger 24 functions as an evaporator. Therefore, the heating capacity of the first indoor heat exchanger 23 is determined by the air volume of the indoor fan 21. The controller 40 controls the first expansion valve 25 in such a way that the degree of superheat (SH) calculated from the difference between the inlet temperature of the second indoor heat exchanger 24 detected by the second inlet temperature sensor 28c and the outlet temperature of the second indoor heat exchanger 24 detected by the second outlet temperature sensor 28d is a predetermined value. For evaporating temperature, the controller 40 controls the operation frequency of the compressor 11, so that a predetermined capacity is ensured.

(High-Capacity Cooling Adsorption Mode)

In high-capacity cooling adsorption mode, the first indoor heat exchanger 23 functions as an evaporator, and the second indoor heat exchanger 24 also functions as an evaporator. This is to increase the cooling capacity of the second indoor heat exchanger 24 and increase the sensible heat factor (SHF) of air conditioning capacity. Then, for the purpose of maximizing the air conditioning capacity, the controller 40 controls the second expansion valve 14 in such a way that the degree of superheat (SH) calculated from the difference between the inlet temperature of the first indoor heat exchanger 23 detected by the first inlet temperature sensor 28a and the outlet temperature of the second indoor heat exchanger 24 detected by the second outlet temperature sensor 28d is a predetermined value. This enables exchange of latent heat between refrigerant and indoor air in the second indoor heat exchanger 24, and increases the cooling capacity of the second indoor heat exchanger 24. For evaporating temperature, the controller 40 controls the operation frequency of the compressor 11, so that a predetermined capacity is ensured.

Switching control for switching between cooling adsorption mode, cooling desorption mode, and high-capacity cooling adsorption mode in cooling operation of the air-conditioning apparatus 100 according to Embodiment 1 will now be described.

(Switching Control for Cooling Adsorption Mode and Cooling Desorption Mode)

In Embodiment 1, dehumidification in cooling operation involves alternate execution of cooling adsorption mode and cooling desorption mode. The timing of switching between cooling adsorption mode and cooling desorption mode is determined, for example, on the basis of time from the start of each mode. For example, switching between cooling adsorption mode and cooling desorption mode takes place every ten minutes. The switching between cooling adsorption mode and cooling desorption mode is made by changing the opening degree of the second expansion valve 14 and the first expansion valve 25. In cooling adsorption mode and cooling desorption mode according to Embodiment 1, air in a space where environmental changes are limited (e.g., indoor space) is used, instead of air in a space where environmental changes are significant (e.g., outdoor space), to adsorb and desorb moisture to and from the adsorption material. This facilitates prediction of conditions under which the adsorption material will reach equilibrium.

Therefore, even when switching between cooling adsorption mode and cooling desorption mode is made at predetermined switching intervals, it is possible to make full use of the adsorption capacity of the adsorption material in cooling adsorption mode and the desorption capacity of the adsorption material in cooling desorption mode. This enables continuous dehumidifying operation while maintaining the dehumidifying capacity. To optimize the dehumidifying capacity, the setting of the switching intervals may be changed by an external operation. The timing of switching between cooling adsorption mode and cooling desorption mode may be determined on the basis of the temperature in the state at point C1 and that at point C2. In this case, switching to cooling desorption mode takes place when the temperature in the state at point C1 stops falling in cooling adsorption mode, and switching to cooling adsorption mode takes place when the temperature in the state at point C2 stops rising in cooling desorption mode.

As described above, the temperature of air flowing into the adsorption and desorption device 22 in cooling adsorption mode is lower than the temperature of air flowing into the adsorption and desorption device 22 in cooling desorption mode. The moisture transfer rate in the adsorption material decreases with decreasing temperature. This means that if the amount of moisture transferred between air and the adsorption material in cooling adsorption mode is the same as that in cooling desorption mode, it tends to take more time to reach saturation in cooling adsorption mode.

Accordingly, by setting the execution time of cooling adsorption mode longer than the execution time of cooling desorption mode, the amount of moisture transferred per volume of the adsorption material can be increased in both cooling adsorption mode and cooling desorption mode. It is thus possible to make full use of the adsorption capacity and the desorption capacity of the adsorption material, and improve the dehumidifying capacity per volume of the adsorption material. Since this makes it possible to reduce the size or thickness of the adsorption material and the adsorption and desorption device 22 while maintaining the dehumidifying capacity, loss of air pressure in the adsorption and desorption device 22 can be reduced.

(Switching Control for Cooling Adsorption Mode and High-Capacity Cooling Adsorption Mode)

When high cooling capacity is required, cooling adsorption mode needs to be switched to high-capacity cooling adsorption mode. The switching from cooling adsorption mode to high-capacity cooling desorption mode may take place, for example, at the time of startup or when sensible heat load is high.

The air-conditioning apparatus 100 according to Embodiment 1 includes the outdoor unit 10 including the compressor 11 and the outdoor heat exchanger 13 and configured to draw in outdoor air from an outdoor space and blow out the outdoor air to the outdoor space; and the indoor unit 20 including the first expansion valve 25, the first indoor heat exchanger 23, and the second indoor heat exchanger 24 and configured to draw in indoor air from an indoor space and blow out the indoor air to the indoor space. The air-conditioning apparatus 100 includes the second expansion valve 14 installed in the outdoor unit 10 or the indoor unit 20; the refrigerant circuit in which the compressor 11, the outdoor heat exchanger 13, the second expansion valve 14, the first indoor heat exchanger 23, the first expansion valve 25, and the second indoor heat exchanger 24 are sequentially connected by pipes; the adsorption and desorption device 22 including the adsorption material configured to adsorb moisture in air; and the controller 40 configured to control the opening degree of the first expansion valve 25 and the second expansion valve 14. The indoor unit 20 has the air passage 20a formed therein to allow the indoor air drawn in the indoor unit 20 to pass therethrough. The first indoor heat exchanger 23, the adsorption and desorption device 22, and the second indoor heat exchanger 24 are arranged in the air passage 20a. The second indoor heat exchanger 24 is disposed downstream of the first indoor heat exchanger 23, and the adsorption and desorption device 22 is disposed downstream of the first indoor heat exchanger 23 and upstream of the second indoor heat exchanger 24. To perform dehumidifying control, the controller 40 controls the opening degree of the first expansion valve 25 and the second expansion valve 14 to enable switching between cooling adsorption mode where the adsorption and desorption device 22 adsorbs moisture in the indoor air and cooling desorption mode where the adsorption and desorption device 22 desorbs the adsorbed moisture.

The air-conditioning apparatus 100 according to Embodiment 1 includes the indoor unit 20 that draws in indoor air from an indoor space and blows out the indoor air to the indoor space. That is, indoor air, which is more stable in humidity than outdoor air, is supplied to the indoor space. To perform dehumidifying control, the controller 40 controls the opening degree of the first expansion valve 25 and the second expansion valve 14 to enable switching between cooling adsorption mode where the adsorption and desorption device 22 adsorbs moisture in the indoor air and cooling desorption mode where the adsorption and desorption device 22 desorbs the adsorbed moisture. That is, no heater is used for adsorption and desorption in the adsorption material of the adsorption and desorption device 22. Stable dehumidifying capacity can thus be delivered with lower power consumption.

In the air-conditioning apparatus 100 according to Embodiment 1, the air passage 20a is shared by cooling adsorption mode and cooling desorption mode.

The air-conditioning apparatus 100 according to Embodiment 1 does not require an air passage switching unit for switching the air passage, between the first indoor heat exchanger 23 and the second indoor heat exchanger 24 in the indoor unit 20. This contributes to reduced size or thickness of the indoor unit 20.

In the air-conditioning apparatus 100 according to Embodiment 1, the adsorption and desorption device 22 is formed by the porous plate 22a.

In the air-conditioning apparatus 100 according to Embodiment 1, where the adsorption and desorption device 22 is formed by the porous plate 22a, the cross-sectional area of the adsorption and desorption device 22 can be made the same as that of the first indoor heat exchanger 23 and the second indoor heat exchanger 24.

In the air-conditioning apparatus 100 according to Embodiment 1, in cooling adsorption mode, the controller 40 sets the opening degree of the second expansion valve 14 lower than the opening degree of the first expansion valve 25, whereas in cooling desorption mode, the controller 40 sets the opening degree of the second expansion valve 14 higher than the opening degree of the first expansion valve 25.

In the air-conditioning apparatus 100 according to Embodiment 1, cooling adsorption mode and cooling desorption mode can be switched from one to the other by controlling the opening degree of the first expansion valve 25 and the second expansion valve 14.

In the air-conditioning apparatus 100 according to Embodiment 1, the controller 40 switches cooling adsorption mode and cooling desorption mode in such a way that the execution time of cooling adsorption mode is longer than the execution time of cooling desorption mode.

In the air-conditioning apparatus 100 according to Embodiment 1, where the execution time of cooling adsorption mode is longer than the execution time of cooling desorption mode, the amount of moisture transferred per volume of the adsorption material is increased in both cooling adsorption mode and cooling desorption mode. It is thus possible to make full use of the adsorption capacity and the desorption capacity of the adsorption material, and improve the dehumidifying capacity per volume of the adsorption material. Since this can reduce the size or thickness of the adsorption material and the adsorption and desorption device 22 while maintaining the dehumidifying capacity, it is possible to reduce loss of air pressure in the adsorption and desorption device 22.

The air-conditioning apparatus 100 according to Embodiment 1 has high-capacity cooling adsorption mode in which the controller 40 controls the second expansion valve 14 in such a way that the difference between the inlet temperature detected by the first inlet temperature sensor 28a and the outlet temperature detected by the second outlet temperature sensor 28d is a predetermined value.

The air-conditioning apparatus 100 according to Embodiment 1 has high-capacity cooling adsorption mode that can provide higher cooling capacity than cooling adsorption mode where the second expansion valve 14 is controlled in such a way that the difference between the inlet temperature detected by the first inlet temperature sensor 28a and the outlet temperature detected by the first outlet temperature sensor 28b is a predetermined value. That is, in high-capacity cooling adsorption mode, to ensure cooling capacity in the second indoor heat exchanger 24, the position where the temperature is measured for calculating the degree of superheat (SH) differs from that in cooling adsorption mode, and also in high-capacity cooling adsorption mode, the opening degree of the second expansion valve 14 and the operation frequency of the compressor 11 differ from those in cooling adsorption mode. In cooling adsorption mode, sensible heat is exchanged between refrigerant and indoor air in the second indoor heat exchanger 24. In high-capacity cooling adsorption mode, however, latent heat is exchanged between refrigerant and indoor air in the second indoor heat exchanger 24, and this enables more effective cooling of air in the second indoor heat exchanger 24. High-capacity cooling adsorption mode can support operations even under high load conditions, such as operations at the time of startup or under conditions of high sensible heat load.

In the air-conditioning apparatus 100 according to Embodiment 1, for air with a relative humidity of 40% to 100%, the amount of equilibrium adsorption per unit mass of the adsorption material linearly increases with increasing relative humidity.

In the air-conditioning apparatus 100 according to Embodiment 1, for air with a relative humidity of 40% to 100%, the amount of equilibrium adsorption per unit mass of the adsorption material linearly increases with increasing relative humidity. It is thus possible to increase the difference between the amount of equilibrium adsorption on the adsorption material from air passing through the adsorption and desorption device 22 in cooling adsorption mode, and the amount of equilibrium adsorption on the adsorption material from air passing through the adsorption and desorption device 22 in cooling desorption mode. The adsorption capacity and the desorption capacity of the adsorption material can thus be improved.

In the air-conditioning apparatus 100 according to Embodiment 1, the amount of equilibrium adsorption per unit mass of the adsorption material for air with a relative humidity of 80% to 100%, is greater than or equal to 1.2 times the amount of equilibrium adsorption per unit mass of the adsorption material for air with a relative humidity of 40% to 60%.

In the air-conditioning apparatus 100 according to Embodiment 1, the amount of equilibrium adsorption per unit mass of the adsorption material for air with a relative humidity of 80% to 100%, is greater than or equal to 1.2 times the amount of equilibrium adsorption per unit mass of the adsorption material for air with a relative humidity of 40% to 60%. A loss of dehumidifying capacity caused by a decrease in the temperature of inflow air can thus be reduced.

Embodiment 2

Embodiment 2 will now be described. Note that the same description as that of Embodiment 1 will be omitted and parts that are the same as, or correspond to, those in Embodiment 1 are assigned the same reference numerals.

Since the adsorption and desorption device 22 has heat capacity, heat loss occurs at the time of switching between cooling adsorption mode, which is adsorption operation, and cooling desorption mode, which is desorption operation, in Embodiment 1. Also, in Embodiment 1, the presence of the adsorption and desorption device 22 between the first indoor heat exchanger 23 and the second indoor heat exchanger 24 may increase the size of the indoor unit 20.

Accordingly, in Embodiment 2, instead of the adsorption and desorption device 22 separate from both the first indoor heat exchanger 23 and the second indoor heat exchanger 24, an adsorption heat exchanger 26 that combines the first indoor heat exchanger 23 and the adsorption material is provided.

[Configuration of Air-Conditioning Apparatus 100]

Figure 11:
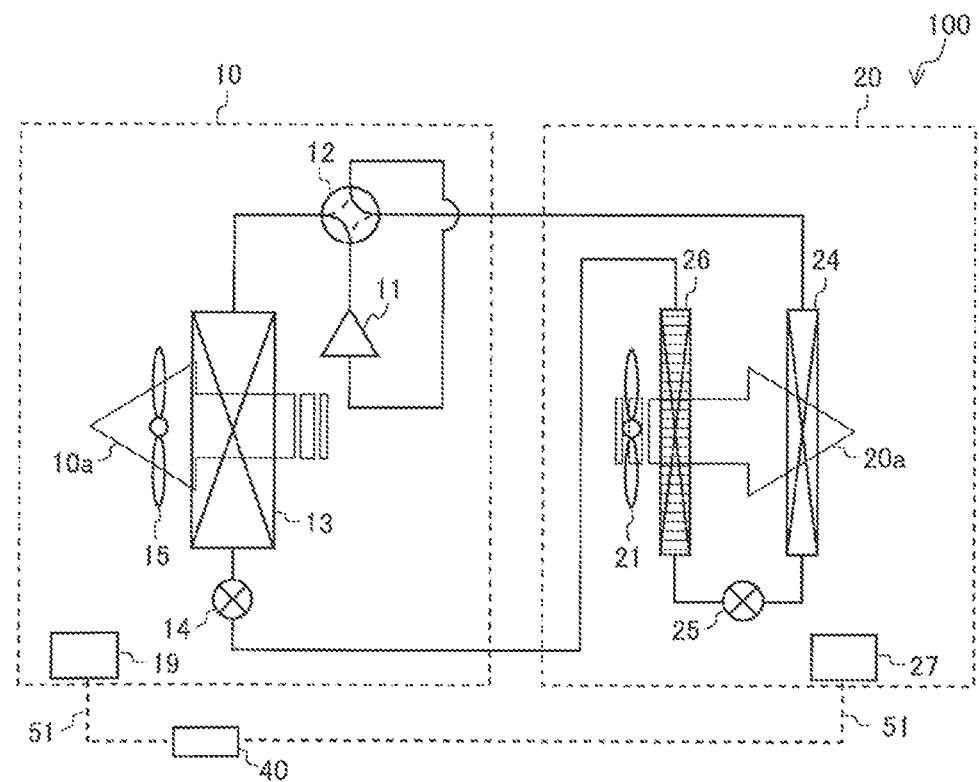
FIG. 11 is a refrigerant circuit diagram illustrating an exemplary configuration of an air-conditioning apparatus according to Embodiment 2.

FIG. 11 is a refrigerant circuit diagram illustrating an exemplary configuration of the air-conditioning apparatus 100 according to Embodiment 2. As illustrated in FIG. 11, in Embodiment 2, the adsorption and desorption device 22 according to Embodiment 1 is replaced by the adsorption heat exchanger 26 that combines the first indoor heat exchanger 23 and the adsorption material.

The adsorption heat exchanger 26 is connected in series to the second indoor heat exchanger 24 and disposed most upstream of the air passage 20a in the indoor unit 20. The adsorption heat exchanger 26 is obtained by forming the adsorption material on the surface of the first indoor heat exchanger 23. The adsorption material is formed by being applied to, or supported on, the surface of the first indoor heat exchanger 23. In the adsorption heat exchanger 26, the evaporation heat of refrigerant evaporating in the first indoor heat exchanger 23 can be directly used in adsorption reaction of the adsorption material without being transmitted through air.

The operation of the air-conditioning apparatus 100 according to Embodiment 2 in each mode of cooling operation will now be described. Note that the description of operation in heating operation will be omitted.

(Cooling Adsorption Mode)

Figure 12:
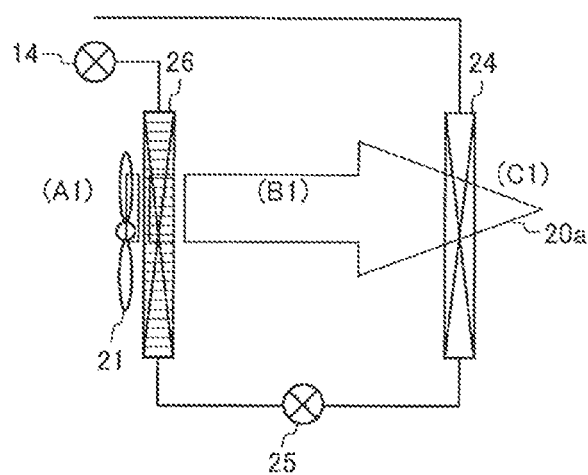
FIG. 12 is a schematic view for explaining an operation in cooling adsorption mode of the air-conditioning apparatus according to Embodiment 2.

FIG. 12 is a schematic view for explaining an operation in cooling adsorption mode of the air-conditioning apparatus 100 according to Embodiment 2. In cooling adsorption mode, high-temperature high-pressure gas refrigerant discharged from the compressor 11 passes through the refrigerant flow switching device 12 and flows into the outdoor heat exchanger 13. The high-temperature high-pressure gas refrigerant flowing into the outdoor heat exchanger 13 exchanges heat with outdoor air drawn in by the outdoor fan 15, condenses to high-pressure liquid refrigerant while rejecting heat, and flows out of the outdoor heat exchanger 13. The high-pressure liquid refrigerant flowing out of the outdoor heat exchanger 13 is reduced in pressure to low-temperature low-pressure two-phase gas-liquid refrigerant by the second expansion valve 14 set at a relatively low opening degree, and flows into the adsorption heat exchanger 26. The low-temperature low-pressure two-phase gas-liquid refrigerant flowing into the adsorption heat exchanger 26 exchanges heat with indoor air drawn in by the indoor fan 21, evaporates to low-pressure gas refrigerant while removing heat to cool the indoor air, and flows out of the adsorption heat exchanger 26. The low-pressure gas refrigerant flowing out of the adsorption heat exchanger 26 is reduced in pressure by the first expansion valve 25 set at a relatively high opening degree, and flows into the second indoor heat exchanger 24. The low-pressure gas refrigerant flowing into the second indoor heat exchanger 24 exchanges heat with indoor air passing through the adsorption heat exchanger 26, evaporates while removing heat, and exchanges sensible heat with the indoor air to further cool the indoor air. The low-pressure gas refrigerant flowing out of the second indoor heat exchanger 24 flows out of the indoor unit 20. The low-pressure gas refrigerant flowing out of the indoor unit 20 is suctioned into the compressor 11.

Figure 13:
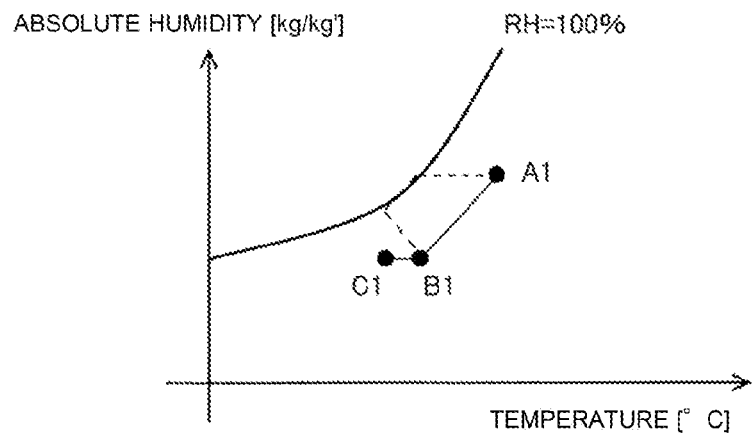
FIG. 13 is a psychrometric chart showing a state change of air in cooling adsorption mode of the air-conditioning apparatus according to Embodiment 2.

FIG. 13 is a psychrometric chart showing a state change of air in cooling adsorption mode of the air-conditioning apparatus 100 according to Embodiment 2. In FIG. 13, the horizontal axis represents temperature [° C.] and the vertical axis represents absolute humidity [kg/kg']. Point A1, point B1, and point C1 in FIG. 13 correspond to the positions of (A1), (B1), and (C1), respectively, in FIG. 12. In cooling adsorption mode, the second expansion valve 14 is set at a relatively low opening degree, and the first expansion valve 25 is set at a relatively high opening degree. Note that FIG. 13 is a diagram showing how the state of air changes when the adsorption heat exchanger 26 retains only a small amount of moisture, for example, when ambient air is saturated.

In FIG. 13, the state change of air according to Embodiment 1, shown in FIG. 6, is indicated by a broken line. The state of air at point A1 shown in FIG. 13 is the same as the state of air at point A1 shown in FIG. 6. The states of air at point B1 and point C1 shown in FIG. 13 are the same as the states of air at point C1 and point D1, respectively, shown in FIG. 6.

In Embodiment 1, the evaporation heat of refrigerant in the first indoor heat exchanger 23 is transmitted through air in the air passage 20a to the adsorption material of the adsorption and desorption device 22. This may lead to heat loss caused by transfer of the evaporation heat of refrigerant to components other than the adsorption material.

In Embodiment 2, on the other hand, the evaporation heat of refrigerant is transmitted directly to the adsorption material without being transmitted through air. This prevents the heat loss described above, and enables highly efficient cooling of the adsorption material. It is thus possible to set the evaporating temperature high in cooling adsorption mode, and improve energy efficiency of the air-conditioning apparatus 100.

(Cooling Desorption Mode)

Figure 14:
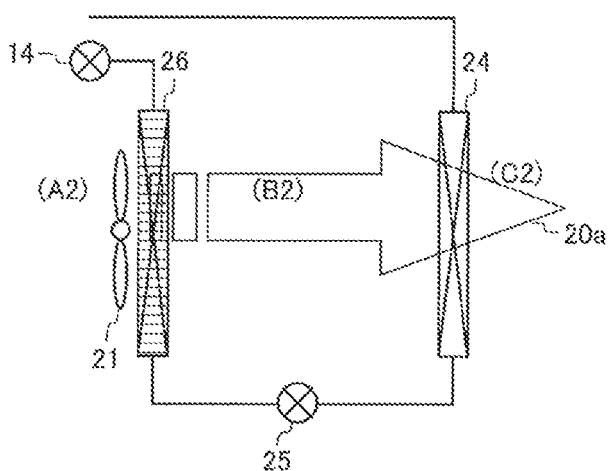
FIG. 14 is a schematic view for explaining an operation in cooling desorption mode of the air-conditioning apparatus according to Embodiment 2.

FIG. 14 is a schematic view for explaining an operation in cooling desorption mode of the air-conditioning apparatus 100 according to Embodiment 2. In cooling desorption mode, high-temperature high-pressure gas refrigerant discharged from the compressor 11 passes through the refrigerant flow switching device 12 and flows into the outdoor heat exchanger 13. The high-temperature high-pressure gas refrigerant flowing into the outdoor heat exchanger 13 exchanges heat with outdoor air drawn in by the outdoor fan 15, condenses to high-pressure liquid refrigerant while rejecting heat, and flows out of the outdoor heat exchanger 13. The high-pressure liquid refrigerant flowing out of the outdoor heat exchanger 13 is reduced in pressure by the second expansion valve 14 set at a relatively high opening degree, and flows into the adsorption heat exchanger 26. The liquid refrigerant flowing into the adsorption heat exchanger 26 exchanges heat with indoor air drawn in by the indoor fan 21, condenses to heat the indoor air while rejecting heat, and flows out of the adsorption heat exchanger 26. The liquid refrigerant flowing out of the adsorption heat exchanger 26 is reduced in pressure to low-temperature low-pressure two-phase gas-liquid refrigerant by the first expansion valve 25 set at a relatively low opening degree, and flows into the second indoor heat exchanger 24. The low-temperature low-pressure two-phase gas-liquid refrigerant flowing into the second indoor heat exchanger 24 exchanges heat with indoor air passing through the adsorption heat exchanger 26, evaporates to low-pressure gas refrigerant while removing heat to cool the indoor air, and flows out of the second indoor heat exchanger 24. The low-pressure gas refrigerant flowing out of the second indoor heat exchanger 24 flows out of the indoor unit 20. The low-pressure gas refrigerant flowing out of the indoor unit 20 is suctioned into the compressor 11.

Figure 15:
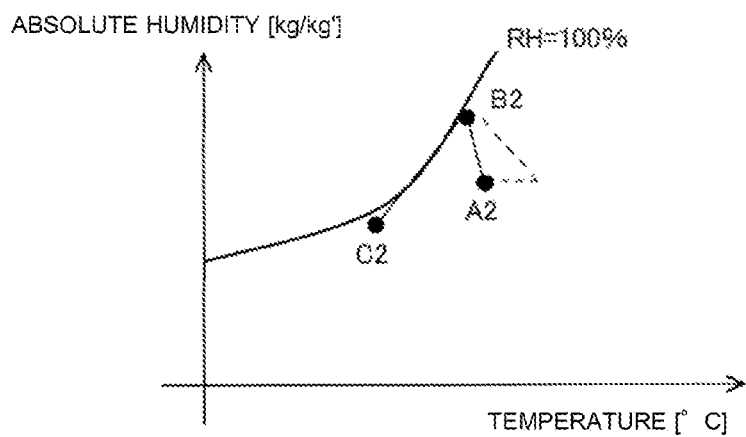
FIG. 15 is a psychrometric chart showing a state change of air in cooling desorption mode of the air-conditioning apparatus according to Embodiment 2.

FIG. 15 is a psychrometric chart showing a state change of air in cooling desorption mode of the air-conditioning apparatus 100 according to Embodiment 2. In FIG. 15, the horizontal axis represents temperature [° C.] and the vertical axis represents absolute humidity [kg/kg']. Point A2, point B2, and point C2 in FIG. 15 correspond to the positions of (A2), (B2), and (C2), respectively, in FIG. 14. In cooling desorption mode, the second expansion valve 14 is set at a relatively high opening degree, and the first expansion valve 25 is set at a relatively low opening degree. Note that FIG. 15 is a diagram showing how the state of air changes when the adsorption heat exchanger 26 retains a large amount of moisture, for example, when saturation is reached in cooling adsorption mode.

In FIG. 15, the state change of air according to Embodiment 1, shown in FIG. 8, is indicated by a broken line. The state of air at point A2 shown in FIG. 15 is the same as the state of air at point A2 shown in FIG. 8. The states of air at point B2 and point C2 shown in FIG. 15 are the same as the states of air at point C2 and point D2, respectively, shown in FIG. 8.

(High-Capacity Cooling Adsorption Mode)

Figure 16:
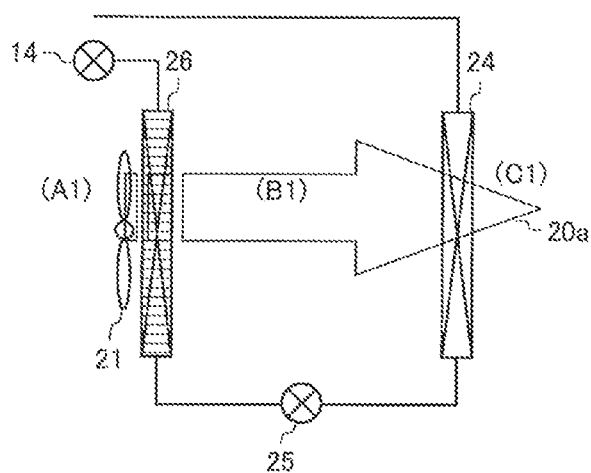
FIG. 16 is a schematic view for explaining an operation in high-capacity cooling adsorption mode of the air-conditioning apparatus according to Embodiment 2.

FIG. 16 is a schematic view for explaining an operation in high-capacity cooling adsorption mode of the air-conditioning apparatus 100 according to Embodiment 2. In high-capacity cooling adsorption mode, high-temperature high-pressure gas refrigerant discharged from the compressor 11 passes through the refrigerant flow switching device 12 and flows into the outdoor heat exchanger 13. The high-temperature high-pressure gas refrigerant flowing into the outdoor heat exchanger 13 exchanges heat with outdoor air drawn in by the outdoor fan 15, condenses to high-pressure liquid refrigerant while rejecting heat, and flows out of the outdoor heat exchanger 13. The high-pressure liquid refrigerant flowing out of the outdoor heat exchanger 13 is reduced in pressure to low-temperature low-pressure two-phase gas-liquid refrigerant by the second expansion valve 14 set at a relatively low opening degree, and flows into the adsorption heat exchanger 26. The low-temperature low-pressure two-phase gas-liquid refrigerant flowing into the adsorption heat exchanger 26 exchanges heat with indoor air drawn in by the indoor fan 21, evaporates while removing heat to cool the indoor air, and flows out of the adsorption heat exchanger 26. The low-temperature low-pressure two-phase gas-liquid refrigerant flowing out of the adsorption heat exchanger 26 is reduced in pressure by the first expansion valve 25 set at a relatively high opening degree, and flows into the second indoor heat exchanger 24. The low-temperature low-pressure two-phase gas-liquid refrigerant flowing into the second indoor heat exchanger 24 exchanges heat with indoor air passing through the adsorption heat exchanger 26, evaporates while removing heat, exchanges latent heat with the indoor air to further cool the indoor air, and flows out of the second indoor heat exchanger 24 as low-pressure gas refrigerant. The low-pressure gas refrigerant flowing out of the second indoor heat exchanger 24 flows out of the indoor unit 20. The low-pressure gas refrigerant flowing out of the indoor unit 20 is suctioned into the compressor 11.

Figure 17:
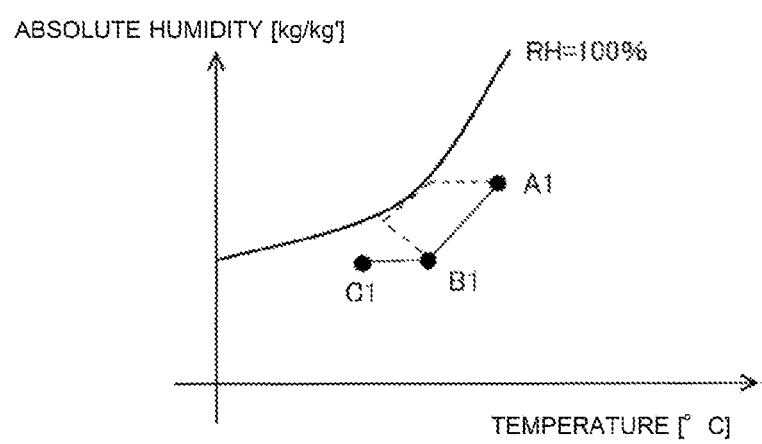
FIG. 17 is a psychrometric chart showing a state change of air in high-capacity cooling adsorption mode of the air-conditioning apparatus according to Embodiment 2.

FIG. 17 is a psychrometric chart showing a state change of air in high-capacity cooling adsorption mode of the air-conditioning apparatus 100 according to Embodiment 2. In FIG. 17, the horizontal axis represents temperature [° C.] and the vertical axis represents absolute humidity [kg/kg']. Point A1, point B1, and point C1 in FIG. 17 correspond to the positions of (A1), (B1), and (C1), respectively, in FIG. 16. In high-capacity cooling adsorption mode, the second expansion valve 14 is set at a relatively low opening degree, and the first expansion valve 25 is set at a relatively high opening degree. Note that FIG. 17 is a diagram showing how the state of air changes when the adsorption heat exchanger 26 retains only a small amount of moisture, for example, when ambient air is saturated.

In FIG. 17, the state change of air according to Embodiment 1, shown in FIG. 10, is indicated by a broken line. The state of air at point A1 shown in FIG. 17 is the same as the state of air at point A1 shown in FIG. 10. The states of air at point B1 and point C1 shown in FIG. 17 are the same as the states of air at point C1 and point D1, respectively, shown in FIG. 10.

In Embodiment 1, the evaporation heat of refrigerant in the first indoor heat exchanger 23 is transmitted through air flowing in the air passage 20a to the adsorption material of the adsorption and desorption device 22. This may lead to heat loss caused by transfer of the evaporation heat of refrigerant to components other than the adsorption material.

In Embodiment 2, on the other hand, evaporation heat of refrigerant is transmitted directly to the adsorption material without being transmitted through air. This prevents the heat loss described above, and enables highly efficient cooling of the adsorption material. It is thus possible to set the evaporating temperature high in high-capacity cooling adsorption mode, and improve energy efficiency of the air-conditioning apparatus 100.

Switching control for switching between different modes in cooling operation of the air-conditioning apparatus 100 according to Embodiment 2 will now be described.

(Switching Control for Cooling Adsorption Mode and Cooling Desorption Mode)

In Embodiment 2, dehumidification involves alternate execution of cooling adsorption mode and cooling desorption mode. The timing of switching between cooling adsorption mode and cooling desorption mode is determined, for example, on the basis of time from the start of each mode. For example, switching between cooling adsorption mode and cooling desorption mode takes place every ten minutes. The switching between cooling adsorption mode and cooling desorption mode is made by changing the opening degree of the second expansion valve 14 and the first expansion valve 25. In cooling adsorption mode and cooling desorption mode according to Embodiment 2, air in a space where environmental changes are limited (e.g., indoor space) is used, instead of air in a space where environmental changes are significant (e.g., outdoor space), to adsorb and desorb moisture to and from the adsorption material. This facilitates prediction of conditions under which the adsorption material will reach equilibrium.

Therefore, even when switching between cooling adsorption mode and cooling desorption mode is made at predetermined switching intervals, it is possible to make full use of the adsorption capacity of the adsorption material in cooling adsorption mode and the desorption capacity of the adsorption material in cooling desorption mode. This enables continuous dehumidifying operation while maintaining the dehumidifying capacity. To optimize the dehumidifying capacity, the setting of the switching intervals may be changed by an external operation. The timing of switching between cooling adsorption mode and cooling desorption mode may be determined on the basis of the temperature in the state at point B1 and that at point B2. In this case, switching to cooling desorption mode takes place when the temperature in the state at point B1 stops falling in cooling adsorption mode, and switching to cooling adsorption mode takes place when the temperature in the state at point B2 stops rising in cooling desorption mode.

In cooling adsorption mode, an adsorption reaction occurs on the surface of the adsorption heat exchanger 26, in which moisture in air is adsorbed and the adsorption heat is rejected. The adsorption heat generated is concurrently treated by latent heat generated by phase change of refrigerant. Therefore, as compared to Embodiment 1, changes in passing air caused by adsorption heat are smaller and the adsorption rate tends to be higher in Embodiment 2.

In cooling desorption mode, the desorption rate may be changed depending on the amount of heating from the refrigerant. In cooling adsorption mode, where no drainage actually occurs, the actual amount of drainage generation is zero. The amount of dehumidification is more likely to increase when cooling desorption mode is longer than cooling adsorption mode.

Accordingly, by setting the execution time of cooling desorption mode longer than the execution time of cooling adsorption mode, the amount of moisture transferred per volume of the adsorption material can be increased in both cooling adsorption mode and cooling desorption mode. It is thus possible to make full use of the adsorption capacity and the desorption capacity of the adsorption material, and improve the dehumidifying capacity per volume of the adsorption material. Since the adsorption and desorption device 22 is absent and the dehumidifying capacity is maintained, the size or thickness of the indoor unit 20 can be reduced.

Since the evaporation heat of refrigerant is transmitted directly to the adsorption material without being transmitted through air, the heat loss described above can be prevented and the adsorption material can be cooled with high efficiency. It is thus possible to set the evaporating temperature high in cooling adsorption mode, and improve energy efficiency of the air-conditioning apparatus 100.

(Switching Control for Cooling Adsorption Mode and High-Capacity Cooling Adsorption Mode)

When high cooling capacity is required, cooling adsorption mode needs to be switched to high-capacity cooling adsorption mode. The switching from cooling adsorption mode to high-capacity cooling desorption mode may take place, for example, at the time of startup or when sensible heat load is high.

The air-conditioning apparatus 100 according to Embodiment 2 includes the outdoor unit 10 including the compressor 11 and the outdoor heat exchanger 13 and configured to draw in outdoor air from an outdoor space and blow out the outdoor air to the outdoor space; and the indoor unit 20 including the first expansion valve 25, the first indoor heat exchanger 23, and the second indoor heat exchanger 24 and configured to draw in indoor air from an indoor space and blow out the indoor air to the indoor space. The air-conditioning apparatus 100 includes the second expansion valve 14 installed in the outdoor unit 10 or the indoor unit 20; the refrigerant circuit in which the compressor 11, the outdoor heat exchanger 13, the second expansion valve 14, the first indoor heat exchanger 23, the first expansion valve 25, and the second indoor heat exchanger 24 are sequentially connected by pipes; and the controller 40 configured to control the opening degree of the first expansion valve 25 and the second expansion valve 14. The first indoor heat exchanger 23 has the adsorption material formed on the surface thereof and configured to adsorb moisture in air. The indoor unit 20 has the air passage 20a formed therein to allow the indoor air drawn in the indoor unit 20 to pass therethrough. The first indoor heat exchanger 23 and the second indoor heat exchanger 24 are arranged in the air passage 20a. The second indoor heat exchanger 24 is disposed downstream of the first indoor heat exchanger 23. To perform dehumidifying control, the controller 40 controls the opening degree of the first expansion valve 25 and the second expansion valve 14 to enable switching between cooling adsorption mode where the first indoor heat exchanger 23 adsorbs moisture in the indoor air and cooling desorption mode where the first indoor heat exchanger 23 desorbs the adsorbed moisture.

The air-conditioning apparatus 100 according to Embodiment 2 includes the indoor unit 20 that draws in indoor air from an indoor space and blows out the indoor air to the indoor space. That is, indoor air, which is more stable in humidity than outdoor air, is supplied to the indoor space. To perform dehumidifying control, the controller 40 controls the opening degree of the first expansion valve 25 and the second expansion valve 14 to enable switching between cooling adsorption mode where the first indoor heat exchanger 23 adsorbs moisture in the indoor air and cooling desorption mode where the first indoor heat exchanger 23 desorbs the adsorbed moisture. That is, no heater is used for adsorption and desorption in the adsorption material of the first indoor heat exchanger 23. Stable dehumidifying capacity can thus be delivered with lower power consumption.

The evaporation heat of refrigerant is transmitted directly to the adsorption material without being transmitted through air. This prevents heat loss caused by transfer of the evaporation heat of refrigerant to components other than the adsorption material, and enables highly efficient cooling of the adsorption material. It is thus possible to set the evaporating temperature high in cooling adsorption mode, and improve energy efficiency of the air-conditioning apparatus 100.

REFERENCE SIGNS LIST

10: outdoor unit, 10a: air passage, 11: compressor, 12: refrigerant flow switching device, 13: outdoor heat exchanger, 14: second expansion valve, 15: outdoor fan, 19: outdoor unit control board, 20: indoor unit, 20a: air passage, 21: indoor fan, 22: adsorption and desorption device, 22a: porous plate, 22b: pore, 23: first indoor heat exchanger, 24: second indoor heat exchanger, 25: first expansion valve, 26: adsorption heat exchanger, 27: indoor unit control board, 28a: first inlet temperature sensor, 28b: first outlet temperature sensor, 28c: second inlet temperature sensor, 28d: second outlet temperature sensor, 40: controller, 41: information acquiring unit, 42: computing unit, 43: device control unit, 44: storage unit, 51: transmission line, 100: air-conditioning apparatus

The invention claimed is:

1. An air-conditioning apparatus comprising:
an outdoor unit including a compressor and an outdoor heat exchanger and configured to draw in outdoor air from an outdoor space and blow out the drawn-in outdoor air to the outdoor space;
an indoor unit including a first expansion valve, a first indoor heat exchanger and a second indoor heat exchanger and configured to draw in indoor air from an indoor space and blow out the drawn-in indoor air to the indoor space;
a second expansion valve provided to the outdoor unit or the indoor unit;
a refrigerant circuit in which the compressor, the outdoor heat exchanger, the second expansion valve, the first indoor heat exchanger, the first expansion valve, the second indoor heat exchanger are connected by pipes in a named order;
an adsorption and desorption device including an adsorption and desorption material configured to adsorb moisture in air; and
a controller configured to control an opening degree of the first expansion valve and the second expansion valve,
the indoor unit having an air passage formed therein and configured to allow the indoor air drawn into the indoor unit to pass therethrough,
the first indoor heat exchanger, the adsorption and desorption device and the second indoor heat exchanger being arranged on the air passage, the second indoor heat exchanger being arranged in downstream of the first indoor heat exchanger, the adsorption and desorption device being arranged in downstream of the first indoor heat exchanger and upstream of the second indoor heat exchanger, the controller being configured to cause the air-conditioning apparatus to operate in
- a cooling adsorption mode to control an opening degree of the first expansion valve and an opening degree of the second expansion valve, and adsorb moisture in the indoor air by the adsorption and desorption device, and
- a cooling desorption mode to desorb the adsorbed moisture, switch the cooling adsorption mode and the cooling desorption mode to perform dehumidifying control, set the opening degree of the second expansion valve lower Man the opening degree of the first expansion valve; and in the cooling desorption mode, set the opening degree of the second expansion valve higher than the opening degree of the first expansion valve.

2. The air-conditioning apparatus of claim 1, wherein the adsorption and desorption device is formed by a porous plate.

3. The air-conditioning apparatus of claim 2, wherein the porous plate is an air permeable member having a plurality of pores formed therein, the pores allowing air to pass therethrough in a direction of thickness of the porous plate.

4. The air-conditioning apparatus of claim 1, wherein the controller switches the cooling adsorption mode and the cooling desorption mode in such a way that execution time of the cooling adsorption mode is longer than execution time of the cooling desorption mode.

5. The air-conditioning apparatus of claim 1, wherein the air passage is shared by the cooling adsorption mode and the cooling desorption mode.

6. The air-conditioning apparatus of claim 1, wherein for air with a relative humidity of 40% to 100%, an amount of equilibrium adsorption per unit mass of the adsorption and desorption material linearly increases with increasing relative humidity.

7. The air-conditioning apparatus of claim 1, wherein an amount of equilibrium adsorption per unit mass of the adsorption and desorption material for air with a relative humidity of 80% to 100%, is greater than or equal to 1.2 times an amount of equilibrium adsorption per unit mass of the adsorption and desorption material for air with a relative humidity of 40% to 60%.

8. The air-conditioning apparatus of claim 1, wherein the controller deter nines timing of switching between the cooling adsorption mode and the cooling desorption mode based on time from start of each mode.

9. The air-conditioning apparatus of claim 1, further comprising:
- a first inlet temperature sensor configured to detect an inlet temperature of the first indoor heat exchanger;
- a first outlet temperature sensor configured to detect an outlet temperature of the first indoor heat exchanger;
- a second inlet temperature sensor configured to detect an inlet temperature of the second indoor heat exchanger; and
- a second outlet temperature sensor configured to detect an outlet temperature of the second indoor heat exchanger, wherein in the cooling adsorption mode, the controller controls the second expansion valve in such a way that a difference between the inlet temperature detected by the first inlet temperature sensor and the outlet temperature detected by the first outlet temperature sensor is a predetermined value, and in the cooling desorption mode, the controller controls the first expansion valve in such a way that a difference between the inlet temperature detected by the second inlet temperature sensor and the outlet temperature detected by the second outlet temperature sensor is a predetermined value.

10. The air-conditioning apparatus of claim 9, wherein the controller has a high-capacity cooling adsorption mode in which the controller controls the second expansion valve in such a way that a difference between the inlet temperature detected by the first inlet temperature sensor and the outlet temperature detected by the second outlet temperature sensor is a predetermined value.

11. An air-conditioning apparatus comprising:
- an outdoor unit including a compressor and an outdoor heat exchanger and configured to draw in outdoor air from an outdoor space and blow out the drawn-in outdoor air to the outdoor space;
- an indoor unit including a first expansion valve, a first indoor heat exchanger and a second indoor heat exchanger and configured to draw in indoor air from an indoor space and blow out the drawn-in indoor air to the indoor space;
- a second expansion valve provided to the outdoor unit or the indoor unit;
- a refrigerant circuit in which the compressor, the outdoor heat exchanger, the second expansion valve, the first indoor heat exchanger, the first expansion valve, and the second indoor heat exchanger are connected by pipes in a named order; and
- a controller configured to control an opening degree of the first expansion valve and the second expansion valve, the first indoor heat exchanger having an adsorption and desorption material formed on a surface thereof, the adsorption and desorption material being configured to adsorb moisture in air, the indoor unit having an air passage formed therein and configured to allow the indoor air drawn into the indoor unit to pass therethrough, the first indoor heat exchanger and the second indoor heat exchanger being arranged in the air passage, the second indoor heat exchanger being disposed downstream of the first indoor heat exchanger, the controller being configured to cause the air-conditioning apparatus to operate in
- a cooling adsorption mode to control an opening degree of the first expansion valve and an opening degree of the second expansion valve, and adsorb moisture in the indoor air by the first indoor heat exchanger, and
- a cooling desorption mode to desorb the adsorbed moisture, and switch the cooling adsorption mode and the cooling desorption mode to perform dehumidifying control, and set the opening degree of the second expansion valve lower than the opening degree of the first expansion valve; and in the cooling desorption mode, set the opening degree of the second expansion valve higher than the opening degree of the first expansion valve.

* * * * *